United States Patent

Zufle

[11] Patent Number: 5,179,244
[45] Date of Patent: Jan. 12, 1993

[54] REINFORCED SOFT AND HARD BODY ARMOR

[76] Inventor: T. Tyler Zufle, Square 1, Lafayette at the River, Gretna, La. 70053-5835

[21] Appl. No.: 486,399

[22] Filed: Feb. 28, 1990

[51] Int. Cl.⁵ .............................. F41H 5/12; B32B 5/12
[52] U.S. Cl. .................................... 89/36.02; 428/113; 428/911
[58] Field of Search ............... 89/36.02; 428/911, 224, 428/113

[56] References Cited

U.S. PATENT DOCUMENTS

| | | | |
|---|---|---|---|
| 4,079,464 | 3/1978 | Roggin | 2/2.5 |
| 4,090,005 | 5/1978 | Morgan | 428/911 X |
| 4,241,457 | 12/1980 | Klein | 2/2.5 |
| 4,674,394 | 6/1987 | Martino | 89/36.05 |
| 4,678,702 | 7/1987 | Lancaster et al. | 428/252 |
| 4,739,690 | 4/1988 | Moskowitz | 89/36.02 |
| 4,813,334 | 3/1989 | Bloks | 89/36.02 |
| 4,923,741 | 5/1990 | Kosmo et al. | 428/552 |

Primary Examiner—Peter A. Nelson
Attorney, Agent, or Firm—Jacobson, Price, Holman & Stern

[57] ABSTRACT

The invention is reinforced soft and hard body armor utilizing a plurality of layers or plies of dissimilar ballistic material in combination with a reinforcing panel positioned inwardly of the multiple plies of ballistic material with the reinforcing panel being constructed of a work hardenable material to reduce penetration of a projectile thereby reducing blunt trauma injury. The multiple plies of ballistic material include a unique arrangement of multiple plies of an aramid fiber available under the trademark "Kevlar" or "TWARON" and multiple plies of a non-woven ballistic material available under the trademark "Spectra Shield" and the reinforcing panel is a polycarbonate material such as available under the trademark "Lexan".

6 Claims, 1 Drawing Sheet

5,179,244

REINFORCED SOFT AND HARD BODY ARMOR

BACKGROUND OF THE INVENTION

1. Field of the Invention

The present invention generally relates to body armor used in combination with various garments and in other applications to resist penetration by a projectile such as a bullet or other ballistic projectile. More specifically, the invention relates to reinforced soft and hard body armor utilizing a plurality of layers or plies of dissimilar ballistic material in combination with a reinforcing panel positioned inwardly of the multiple plies of ballistic material with the reinforcing panel being constructed of a work hardenable material to reduce penetration of a projectile thereby reducing blunt trauma injury. The multiple plies of ballistic material include a unique arrangement of multiple plies of an aramid fiber such as identified by the trademark "Kevlar" or "TWARON" and multiple plies of a non-woven ballistic material identified by the trademark "Spectra Shield" and the reinforcing panel is a polycarbonate material such as identified by the trademark "Lexan".

2. Information Disclosure Statement

Body armor has been developed for use in association with various garments to protect the wearer from injury or death by bullets or other ballistics missiles striking and penetrating various parts of the human anatomy. Law enforcement personnel employ such garments under various circumstances with the body armor usually protecting vital anatomical areas. The body armor which has been developed includes the use of various ballistic materials including "Kevlar" with typical uses of this material being disclosed in my prior U.S. Pat. Nos. 4,535,478 and 4,578,821. While such prior art devices have proved effective, it is well known that all soft body armor and to a certain extent rigid body armor allows energy from the impact of a projectile to be transferred through the armor system and injure the underlying body tissue or bone structure of the person wearing the armor. This injury is known as blunt trauma which is the degree of deformation of the armor which occurs when body armor is struck by a projectile. The highest acceptable level of deformation by the body armor industry is currently a deformation of 1.73" and this deformation is measured in the backing material used to simulate flesh or tissue during a ballistic testing procedure.

The above-mentioned patents and the prior art do not disclose body armor that provides an effective reduction in the deformation and a resultant reduction in blunt trauma injury.

SUMMARY OF THE INVENTION

The present invention generally relates to body armor used in association with various garments or in other uses where it is desirable to prevent or resist penetration by a projectile, ballistic missile or the like which includes a plurality of layers of plies of dissimilar ballistic material combined with a reinforcing panel which work hardens upon impact of an incoming projectile thereby not only reducing penetration but also reducing inward deformation of the body armor and resulting blunt trauma injury to the wearer or user of the body armor.

Another object of the invention is to provide body armor in accordance with the preceding object in which the reinforcing panel is useful with soft body armor and hard body armor and is in the form of a panel of polycarbonate material positioned against the innermost layer or ply of ballistic material, with the reinforcing panel being generally soft, malleable and somewhat flexible until the impact of a projectile at which time the panel work hardens and becomes substantially rigid to prevent penetration and also reduce inward deformation of the body armor thereby reducing the possibility of resultant blunt trauma injury to the wearer or user of the body armor.

A further object of the invention is to provide body armor in accordance with the preceding objects in which a plurality of layers or plies includes multiple plies of aramid fiber available under the trademark "Kevlar" or "TWARON" and multiple plies of a non-woven ballistic material available under the trademark "Spectra Shield" and the reinforcing panel is available under the trademark "Lexan".

A still further object of the invention is to provide reinforced soft or hard body armor for use by law enforcement personnel or others who may be a target for a bullet, projectile or other ballistic missile which is effective in resisting penetration and reducing blunt trauma injury which utilizes existing known materials and is effective to substantially reduce blunt trauma injury caused by inward deformation of the body armor with the body armor remaining relatively lightweight in order for it to be effectively worn when performing various duties and activities.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
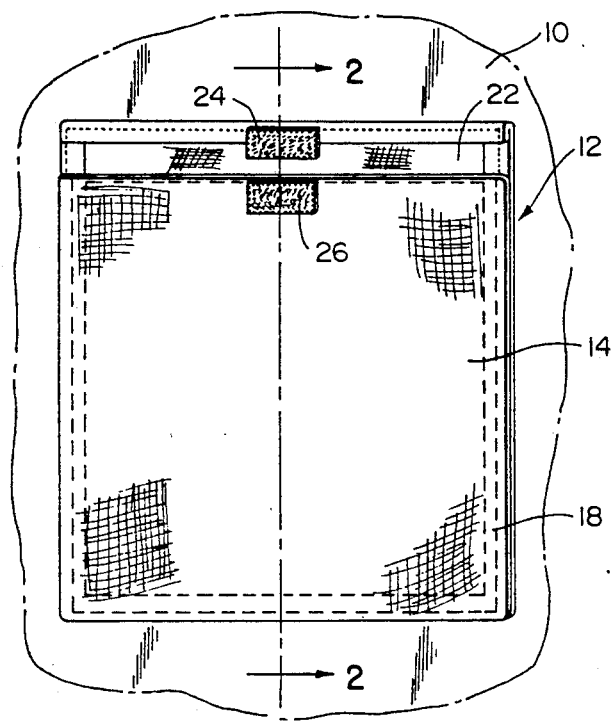
FIG. 1 is an elevational view of a portion of a garment with the body armor of the present invention incorporated therein.
Figure 2:
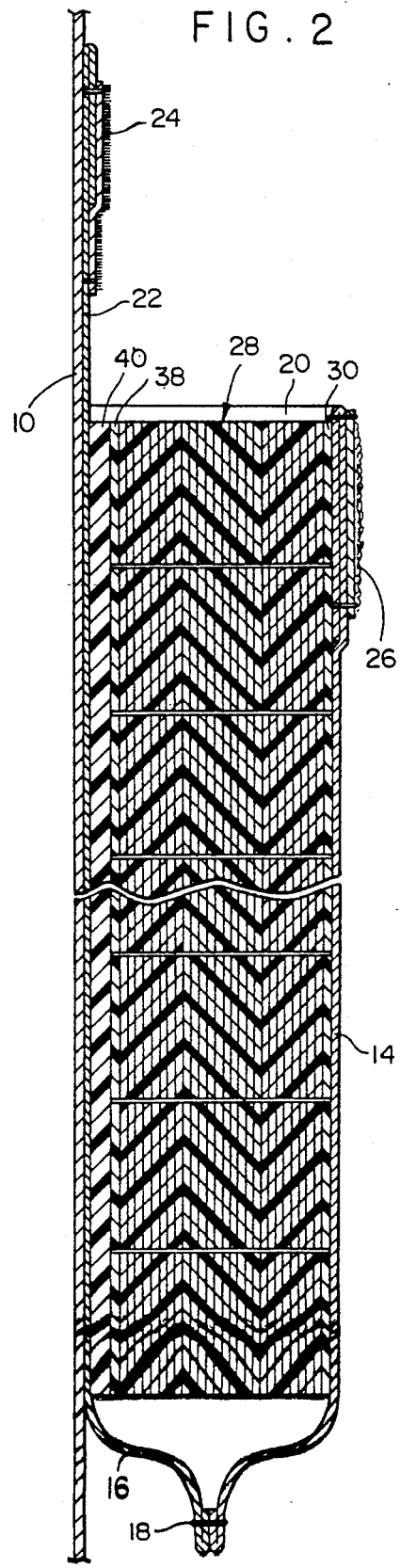
FIG. 2 is a vertical, sectional view, on an enlarged scale, taken along section line 2—2 on FIG. 1 illustrating the structure and orientation of the body armor of the present invention with the reinforcing panel associated therewith.

Referring now specifically to the drawings, FIG. 1 illustrates a garment 10 schematically on which the body armor of the present invention is mounted and which includes a material pocket 12 including an outer layer 14 and an inner layer 16 stitched together around the bottom and sides thereof as at 18 with the pocket being provided with an upwardly opening upper end 20 closed by a closure flap 22 held in closed position by hook and loop pile fastener patches 24 and 26 such as those available under the trademark "Velcro" which provides for easy access to the body armor generally designated by reference numeral 28 which is positionable in the pocket 12 to overlie and protect vital areas of the human anatomy in a well-known manner.

The configuration of the pocket or pouch which removably receives the body armor will vary depending upon the garment to which it is attached and the area of the human anatomy which it is to protect. The body armor 28 includes a plurality of layers or plies of dissimilar ballistic material and includes a single ply outer layer 30 of "Kevlar" which acts as a fireproofing device as well as an impact surface and reinforcing ply to support button tacking as a joining mechanism for the remaining plies of the body armor. Inwardly of the single ply 30, eight plies 32 of "Spectra Shield" are used together with ten plies 34 of "Kevlar". Inwardly of the ten plies 34 of "Kevlar" are eight plies 36 of "Spectra Shield" and a single ply 38 of "Kevlar". Positioned against the "Kevlar" ply 38 is a reinforcing panel 40 which is constructed of "Lexan" manufactured by General Electric. The reinforcing panel 40 is of a polycarbonate material having a thickness of approximately 0.060" with it being understood that various types of polycarbonate-type materials may be used and the thickness may vary from a relatively thin membrane or film to a substantially thick and rigid breastplate construction.

Previously known body armor, whether soft or rigid, permitted at least some of the energy from the impact of an incoming projectile to pass through the body armor and damage or injure the underlying tissue or bone structure of the person wearing the body armor. This characteristic of body armor is known as blunt trauma and is measured by the amount of deformation which occurs in the backing material for the body armor which is equivalent to the body tissue and bone structure of the wearer. During ballistic testing of body armor, the industry which manufactures this product has determined that a deformation of 1.73" is the highest acceptable level of deformation of the innermost surface of the body armor.

The reinforcing structure for both soft and hard body armor of this invention provides greatly diminished deformation and thus a corresponding reduction in body trauma. One of the unique aspects of this material is that the material forming the reinforcing panel remains substantially flexible and can adapt to the contours of the body or other surface which it is to protect as long as it is not impacted or under attack by a ballistic missile or impact load. At the instant of impact by a projectile or ballistic missile, the incoming energy immediately work hardens the polycarbonate reinforcing panel so that what had been a flexible, malleable material, becomes hardened and thus greatly diminishes the amount of energy which is translated to the underlying body tissue, bone structure or the like thus materially reducing blunt trauma.

In tests, a vest with existing body armor allows between 1.25" and 1.40" of backface deformation which, while within the industry standards, still permits some degree of blunt trauma injury to the underlying body tissues and bone structures. The same vest provided with the body armor 28 in accordance with the above disclosure allows only between 0.590" and 0.755" of backface deformation. This reduction in backface deformation is of significant advantage to the wearer of the vest or other user as it allows the user or wearer to not only prevent a penetrating wound but also decreases substantially the possibility of incapacitating blunt trauma injury which could prevent the wearer or user from responding to the ballistic attack.

The materials from which the body armor of this invention is constructed are commercially available and their characteristics well-known. The aramid fiber available under the trademark "Kevlar" is manufactured by Dupont and a specification sheet is attached hereto and identified as Attachment A. A comparable aramid fiber is available under the trademark "TWARON" and is manufactured by Akzo and specification sheets are attached hereto and identified as Attachment B. The non-woven ballistic material sold under the trademark "Spectra Shield" is available from Allied Chemical Company and is made by utilizing a plastic film and fibers an resin bonded together with the adhesive membranes then being combined with the strands in perpendicular relation to provide a sandwich. A specification sheet relating to "Spectra Shield" is attached hereto and identified as Attachment C with these attachments forming a part of the disclosure in this application. The reinforcing panel is a polycarbonate material available from various sources. One such panel which performs satisfactorily is constructed from material available under the trademark "Lexan" from General Electric and is conventionally employed as glazing and has the unique phenomena of hardening when impacted by a projectile or other impact source. The combination of the two dissimilar ballistic materials and the unique arrangement of the plies of these materials produces a synergistic effect when combined with the reinforcing panel.

Figure 3:
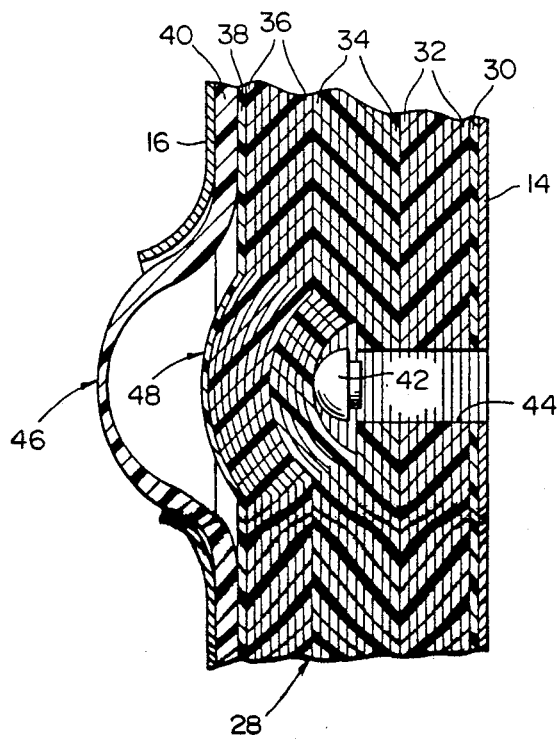
FIG. 3 is a fragmental, sectional view illustrating deformation of the reinforcing panel and movement of a projectile into the interior of the body armor and the deformation of the reinforcing panel caused by that penetration.

FIG. 3 illustrates a projectile in the form of a bullet 42 which in an actual test penetrated and formed a hole 44 in a plurality of the multiple plies forming the body armor. FIG. 3 illustrates the final position of the bullet which has itself been deformed and the deformation of reinforcing panel 40 in the area designated by reference numeral 46 and the deformation of a plurality of the multiple plies in the area designated by reference numeral 48. In an actual test, the inward deformation of the body armor with the reinforcing panel 40 incorporated therein and the unique arrangement of the multiple plies of ballistic material was substantially reduced inasmuch as the projecting area 46 was reduced from a distance of between 1.25" and 1.4" to a distance of 0.590" and 0.755". This reduction in the backface deformation of the body armor under the same test circumstances would substantially reduce blunt trauma injury to body tissue, bone structure or the like inwardly of the deformation area 46 and 48. Additionally, the body armor 28 including the reinforcing panel 40 substantially increases the resistance to penetration of a projectile, bullet or other ballistic missile thereby reducing the possibility of injury to a wearer by penetration of a projectile through the body armor.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A reinforced soft and hard body armor for use in combination with a supporting structure in protective relation to a protected surface to prevent damage to the surface by a projectile approaching the surface at a relatively high velocity, said armor consisting of a plurality of overlying plies of flexible ballistic material, a flexible reinforcing panel engaged with the innermost of the multiple plies and positioned between the multiple plies of ballistic material and the protected surface, said reinforcing panel being malleable and constructed of polycarbonate material which hardens when impacted by a projectile to reduce inward deformation of the multiple plies of ballistic material and the reinforcing panel thereby reducing blunt trauma injury to the protected surface and increasing the reistance to penetration of the projectile to prevent it from contacting the protected surface.

2. The structure as defined in claim 1 wherein said polycarbonate material has a thickness of approximately 0.060".

3. The structure as defined in claim 1 wherein said multiple plies of ballistic material include single outer plies of an aramid fiber and a plurality of layers of aramid fiber and nonwoven ballistic material with two groups of multiple plies of nonwoven ballistic material engaging the outermost single plies of aramid fiber and a group of a plurality of plies of aramid fiber between the groups of non-woven fibers.

4. A ballistic armor for use in combination with a supporting structure in protective relation to a protected surface to prevent damage to the surface by a projectile approaching the surface at a relatively high velocity, said armor comprising a plurality of overlying plies of ballistic material including single outer plies of an aramid fiber and a plurality of layers of aramid fiber and non-woven ballistic material with two groups of multiple plies of non-woven ballistic material engaging the outermost single plies of aramid fiber and a group of a plurality of plies of aramid fiber between the groups of non-woven fibers.

5. The structure as defined in claim 1 wherein said supporting structure is a garment providing an inner layer and outer layer receiving said body armor therebetween, said plurality of overlying plies of flexible ballistic material consisting of a single ply outer layer of aramid fiber, eight plies of non-woven ballistic material inwardly of the single ply outer layer, ten plies of aramid fiber inwardly of the eight plies of non-woven ballistic material, eight plies of non-woven ballistic material inwardly of the ten plies of aramid fiber and a single ply inner layer of aramid fiber inwardly of the eight plies of non-woven ballistic material, said reinforcing panel being positioned inwardly of the single inner ply of aramid fiber, said plies being in surface-to-surface contact for connection by button tacking to maintain the plies in assembled relation, said reinforcing panel being in surface-to-surface contact with said inner ply and being separte therefrom.

6. The structure as defined in claim 5 wherein said aramid fiber plies are selected materials identified by registered trademarks "Kevlar" and "TWARON", said non-woven ballistic material being identified by registered trademark "Spectra Shield" and the reinforcing panel being identified by the registered trademark "Lexan".

* * * * *